April 19, 1949.   G. A. GILLEN   2,467,586
ELECTRIC MOTOR STRUCTURE
Filed Oct. 22, 1946   2 Sheets-Sheet 1
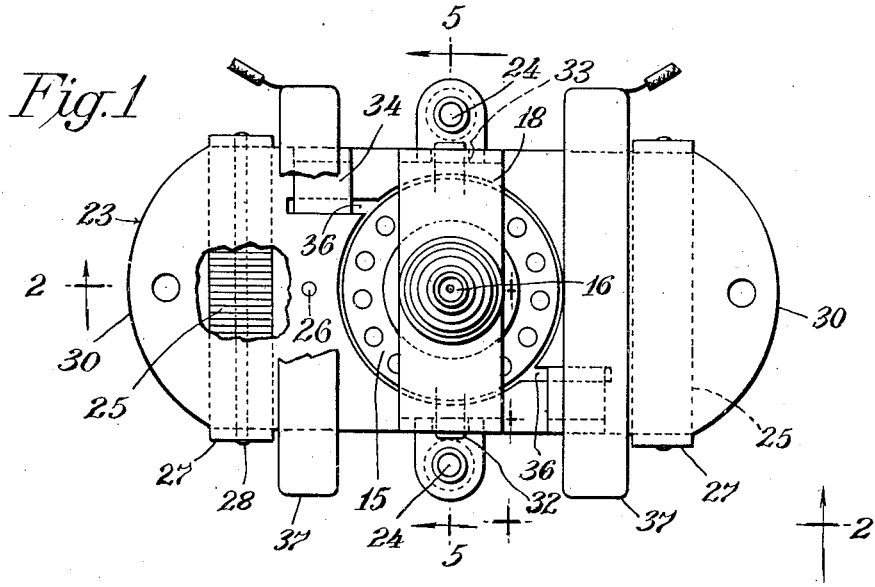
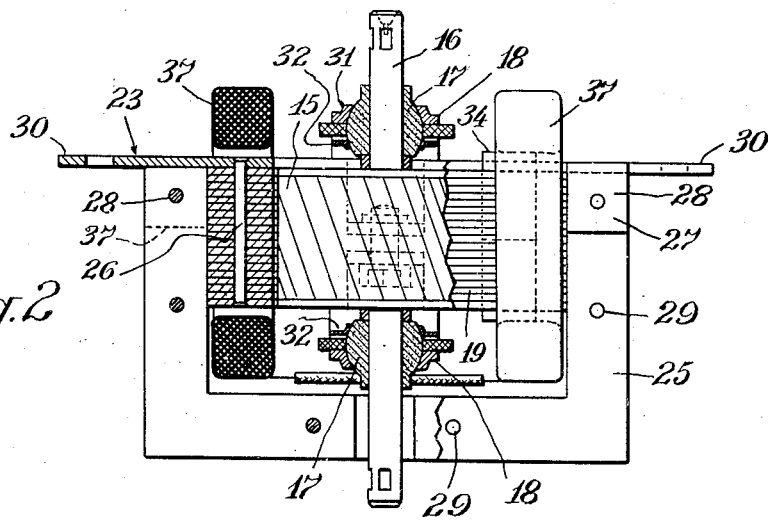
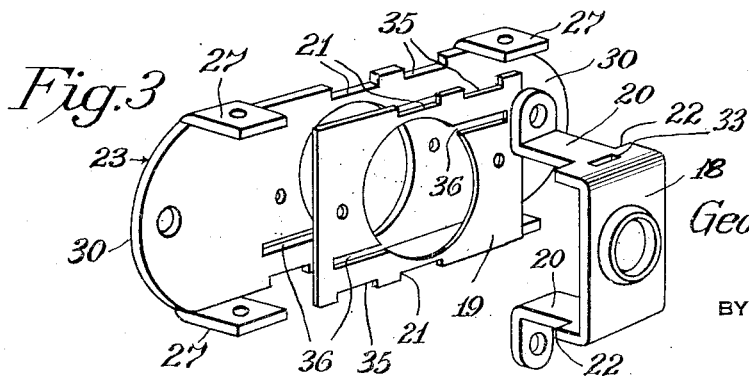
George A. Gillen
INVENTOR
BY
ATTORNEY April 19, 1949.    G. A. GILLEN    2,467,586
ELECTRIC MOTOR STRUCTURE
Filed Oct. 22, 1946    2 Sheets-Sheet 2
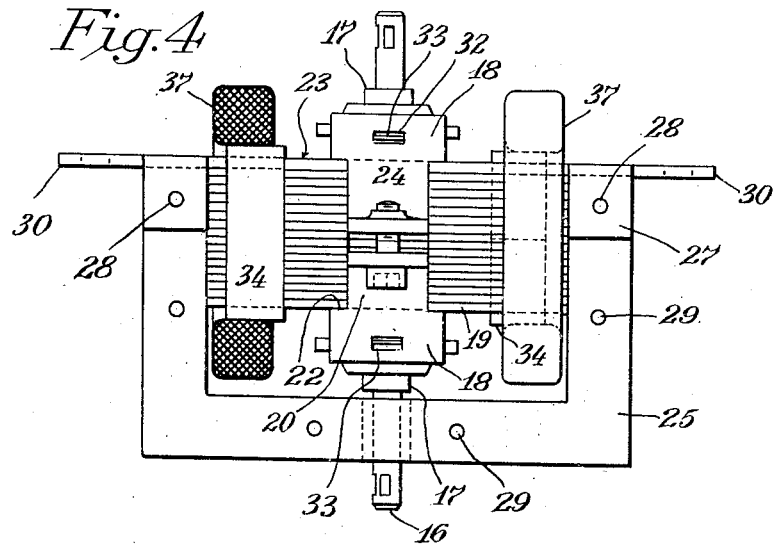
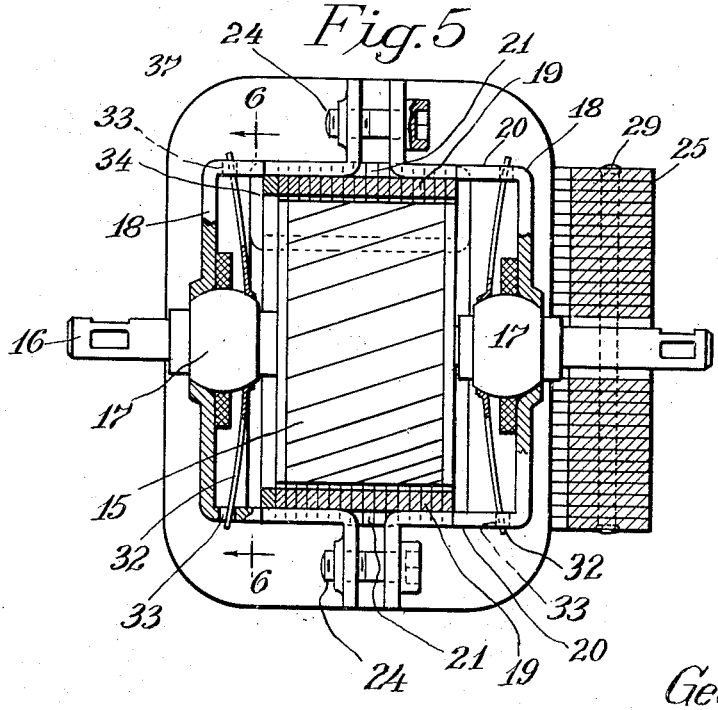
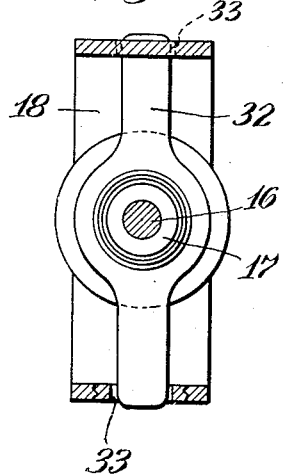
George A. Gillen
INVENTOR
BY
ATTORNEY Patented Apr. 19, 1949

2,467,586

UNITED STATES PATENT OFFICE 2,467,586

ELECTRIC MOTOR STRUCTURE

George A. Gillen, New York, N. Y.

Application October 22, 1946, Serial No. 704,882

2 Claims. (Cl. 172—36)

The invention here disclosed relates to alternating current motors of the shaded pole, squirrel cage rotor type.

Particular objects of the invention are to provide an efficient motor of the type mentioned which can be produced at low cost.

Related objects are to simplify production of parts, reduce waste of material in such production, provide for quick and easy assembly of the parts and assure proper registry and alignment in the act of putting the parts together.

Other objects and the novel features through which the purposes of the invention are attained are set forth or will appear in the course of the following specification.

The drawings accompanying and forming part of the specification illustrate certain present preferred embodiments of the invention. Structure, however, may be modified and changed as regards the immediate illustration, all within the true intent and broad scope of the invention as hereinafter defined and claimed.

Fig. 1 in the drawings is an end view of one of the motors with portions partly broken away;

Fig. 2 is a part sectional and plan view as on substantially the line 2—2 of Fig. 1;

Fig. 3 is a view showing in perspective the end plate, one of the stator laminations and one of the stator clamping bearing supporting brackets;

Fig. 4 is a plan view with one of the field coils shown in section;

Fig. 5 is a cross sectional view as on substantially the plane of line 5—5 of Fig. 1 but on a larger scale;

Fig. 6 is a sectional view as on substantially the plane of line 6—6 of Fig. 5.

In the form of the invention shown the rotor 15 is of the squirrel cage type mounted on a shaft 16, rotating in self-lubricating bearings 17, universally self-adjusting in bearing brackets 18 which clamp the field laminations 19 together.

As shown in Figs. 1 to 6, the bearing brackets have parallel side portions reduced in width at 20 to fit in notches 21 in the edges of the laminations and shoulders 22 at the outer ends of such reduced portions to serve as clamping abutments.

Fig. 4 shows how the shoulders 22 on the inner bearing bracket 18 engage the inner field lamination 19 and the outer bracket engages over a front plate 23 provided for mounting the motor.

Fig. 5 shows how screws 24 draw the ends of the bearing brackets 18 together to line up and clamp the stator laminations 19 together.

The magnetic circuit of the stator is completed in this invention through a magnetic "keeper" made up of U-shaped laminations 25 forming a yoke connecting the ends of the stator laminations 19.

As shown in Figs. 2 and 4, the sides of the U-shaped laminations 25 are substantially parallel and spaced just widely enough to closely fit over the ends of the stator laminations. They are shown secured in this relation by means of the mounting plate 23 which is shown fastened to the stack of stator laminations by through rivets 26 and as having angularly inturned lugs 27 engaged over the ends of the yoke laminations 25 and secured by through rivets 28.

The yoke or keeper laminations 25 are shown as secured together by through rivets or fastenings 29.

The mounting plate 23 is shown as having perforated end extensions or wings 30 for mounting and securing the motor in a motor casing, housing or other support.

For self-adjusting purposes the shaft bearings 17 are shown as of generally spherical design setting in ball sockets 31 provided in the bearing brackets and held by bowed spring plates 32, Figs 5 and 6, caught at their ends in openings 33 in the bearing brackets.

The shading coils are provided in the illustration by flat copper bars 34 seated in the notched and slotted portions 35, 36, of the stator laminations, these bars being bent and their ends secured together as closed rings, substantially as indicated.

The stator windings are shown as made up of a pair of coils 37 which can be engaged over the ends of the stator laminations before the U-shaped keeper laminations are slipped or forced into place over the ends of the stator laminations. After such assembly the coils will be largely housed within and will be held in place on the stator laminations by the keeper laminations.

What is claimed is:

1. An electric motor of the character disclosed comprising polar laminations arranged parallel to a given plane, keeper laminations in a plane at right angles to the plane of the polar laminations and having substantially parallel end portions embracing the ends of the polar laminations, bearing brackets at opposite faces of the polar laminations, means securing said brackets in clamping engagement over said polar laminations and a rotor journaled in said bearing brackets, a mounting plate engaged over the front of said polar laminations and over the ends of said keeper laminations, said mounting plate having rearwardly extended lugs engaged over the end portions of said keeper laminations and means securing said lugs to said end portions of the keeper laminations.

2. An electric motor of the character disclosed comprising polar laminations arranged parallel to a given plane, keeper laminations in a plane at right angles to the plane of the polar laminations and having substantially parallel end portions embracing the ends of the polar laminations, bearing brackets at opposite faces of the polar laminations, means securing said brackets in clamping engagement over said polar laminations and a rotor journaled in said bearing brackets, said polar laminations being notched in opposite edges and said bearing brackets having reduced portions entered in the notches in said polar laminations.

GEORGE A. GILLEN.

REFERENCES CITED

The following references are of record in the file of this patent:

UNITED STATES PATENTS

| Number | Name | Date |
| --- | --- | --- |
| 1,873,397 | Hammond | Aug. 23, 1932 |
| 1,962,431 | Daley | June 12, 1934 |
| 2,146,551 | Putnam | Feb. 7, 1939 |
| 2,284,395 | Kohlhagen | May 26, 1942 |
| 2,355,175 | Olving | Aug. 8, 1944 |
| 2,400,609 | Sherman | May 21, 1946 |